United States Patent [19]

Shimizu

[11] Patent Number: 5,325,171
[45] Date of Patent: Jun. 28, 1994

[54] SYSTEM FOR CALIBRATION OF OPTICAL INSTRUMENT ON SATELLITE WITH REFERENCE LIGHT SOURCE

[75] Inventor: Yukiharu Shimizu, Tokyo, Japan
[73] Assignee: NEC Corporation, Tokyo, Japan
[21] Appl. No.: 946,641
[22] Filed: Sep. 18, 1992

[30] Foreign Application Priority Data

Sep. 20, 1991 [JP] Japan ................... 3-269988
Jan. 23, 1992 [JP] Japan ................... 4-032683

[51] Int. Cl.⁵ ................................................ B64G 1/22
[52] U.S. Cl. ................................. 356/230; 250/252.1
[58] Field of Search ............... 356/445, 446, 448, 438, 356/439, 341, 343, 230; 250/252.1 A

[56] References Cited

U.S. PATENT DOCUMENTS

| | | | |
|---|---|---|---|
| 3,780,299 | 12/1973 | Bock | 356/448 |
| 3,872,315 | 3/1975 | Boll | 356/439 |
| 4,124,803 | 11/1978 | Bowers | 356/448 |
| 4,420,256 | 12/1983 | Fladda et al. | 356/341 |

*Primary Examiner*—Richard A. Rosenberger
*Attorney, Agent, or Firm*—Sughrue, Mion, Zinn, Macpeak & Seas

[57] ABSTRACT

A calibration system for periodically calibrating an optical instrument on board a satellite with reference light. In the disclosed system, a calibration unit has two photodetectors one of which is positioned near the light source which radiates reference light and the other near the aperture from which the reference light emerges toward optics of the instrument. Therefore, it is possible to discriminate between contamination or degradation of the optical instrument and contamination of the calibration unit. Two identical and independent calibration units are employed to provide redundancy and enhance the accuracy of calibration.

6 Claims, 5 Drawing Sheets

SYSTEM FOR CALIBRATION OF OPTICAL INSTRUMENT ON SATELLITE WITH REFERENCE LIGHT SOURCE

BACKGROUND OF THE INVENTION

This invention relates to a system including a reference light source for calibration of an optical instrument on board a satellite in orbit.

In space it is almost inevitable that an onboard optical instrument is contaminated from various sources such as cosmic dust, radiation, gases jetted from thrusters for attitude control and gases evolved from adhesives used in the satellite, and it is impossible to accurately predict the degree of degradation of the optical instrument due to contamination. Therefore, it is useful to carry out periodic calibration of an onboard optical instrument with reference light radiated from an onboard light source. A very stable light source such as a halogen lamp is employed as the reference light source, but still there is a possibility that the quantity of light radiated from the light source slightly changes with the lapse of time. Therefore, a photodetector is provided in the vicinity of the reference light source in order to monitor the quantity of radiated light at any time when the calibration is performed.

The calibration unit includes optics to guide the reference light to the optics of the optical instrument to be calibrated. The optics of the calibration unit is also subject to contamination. Therefore, when the result of calibration seems to indicate degradation of the optical instrument, there is a possibility that the actual event is the contamination of the optics of the calibration unit. That is, it is very difficult to accurately judge whether the optics of the optical instrument to be calibrated is contaminated or the optics of the calibration unit.

SUMMARY OF THE INVENTION

It is an object of the present invention to provide a calibration system for calibrating an optical instrument on board a satellite with reference light, which system can accomplish accurate calibration and makes it possible to discriminate between contamination or degradation of the optical instrument and that of the calibration system.

A calibration system according to the invention comprises a calibration unit which comprises a light source which radiates reference light, a first photodetector positioned in the vicinity of the light source so as to detect the intensity of reference light radiated from the light source, a light path which extends from the light source to an aperture from which the reference light emerges to pass through the optics of the optical instrument to be calibrated and comprises a combination of means for refracting the reference light and means for reflecting the reference light, and a second photodetector positioned in the vicinity of the aperture so as to detect the intensity of the reference light emerging from the aperture.

The primary feature of the invention is the employment of two photodetectors one of which is positioned near the reference light source and the other near the aforementioned aperture. In case of contamination of the optics of the calibration unit it can be detected from a change in the relation between the output of the first photodetector and the output of the second photodetector. Therefore, in periodically calibrating the optical instrument it is possible to discriminate between contamination or degradation of the optical instrument and that of the calibration unit.

Preferably a calibration system according to the invention has two identical and independent calibration units. Reliability of the calibration system is enhanced by redundancy. Furthermore, it is possible to more accurately and minutely check the status of both the optical instrument and the calibration units by performing two-step calibration first with one of the two calibration units and next with the other.

It is possible and advantageous to make the emergence aperture of each calibration unit movable about the optical axis of the optical system of the instrument to be calibrated by using an optical fiber as part of the light path in each calibration unit.

DESCRIPTION OF THE PREFERRED EMBODIMENTS

Figure 1:
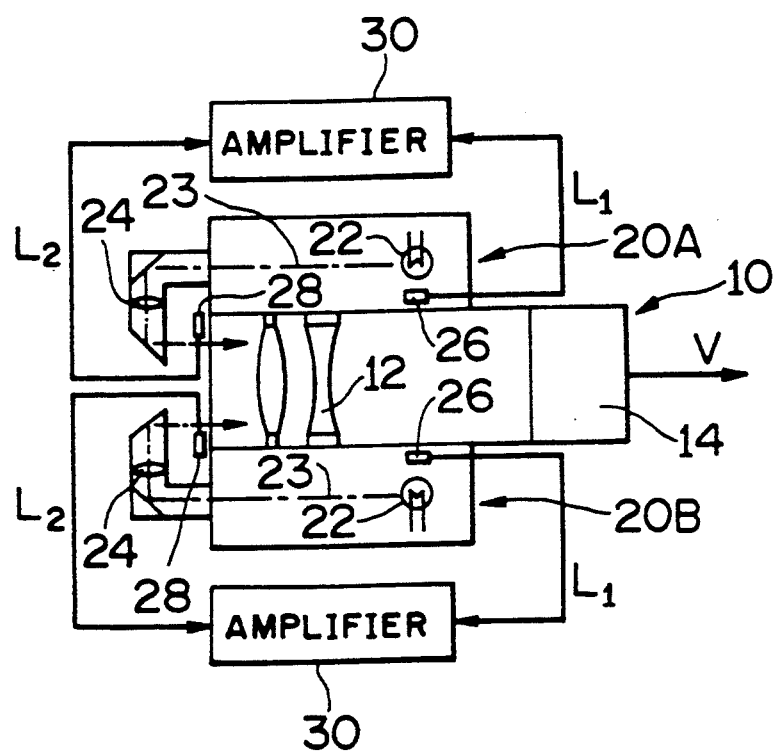
FIG. 1 is a block diagram of a calibration system as an embodiment of the invention.

FIG. 1 shows an embodiment of the invention. Numeral 10 indicates an optical instrument to be installed in a satellite (not shown). The optical instrument 10 has optics 12 and a detector 14 which performs photo-electric conversion. The optical instrument 10 is provided with two calibration units 20A and 20B which are identical in both construction and function.

The calibration unit 20A has a halogen lamp 22 as a reference light source, relay optics 24 to guide reference light 23 t the optics 12 of the instrument 10, a first photodetector 26 which is positioned in the vicinity of the lamp 22, a second photodetector which is positioned at a short distance from the reference light emerging aperture of the relay optics 24 and a light intensity monitoring amplifier 30. When the halogen lamp 22 radiates the reference light 23 the first photodetector 26 produces an electrical signal $L_1$ and the second photodetector 28 an electrical signal $L_2$, and these signals $L_1$ and $L_2$ are respectively amplified by the monitoring amplifier 30. The calibration unit 20B has the same components.

The two calibration units 20A and 20B are used individually and independently. That is, the optical instrument 10 can be calibrated with either of the two calibration units 20A, 20B.

Naturally there is a difference between the output $L_1$ of the first photodetector 26 and the output $L_2$ of the second photodetector 28. The difference between $L_1$ and $L_2$ is measured in advance, i.e. before installing the optical instrument 10 and the calibration units 20A, 20B in the satellite or before launch. When the reference light 23 is directed into the optical instrument 10 the detector 14 of the instrument 10 produces an electrical output V. This output V is also measured in advance.

In the calibration with the calibration unit 20A or 20B, if there is a change in the difference between the output $L_1$ of the first photodetector 26 and the output of the $L_2$ of the second photodetector 28 it is probable that the relay optics 24 of the calibration unit has been contaminated, and if the change in the difference between $L_1$ and $L_2$ is attributed particularly to a decrease in $L_1$ it is probable that the halogen lamp 22 has deteriorated. If the output V of the optical instrument 10 decreases while there is little change in the difference between the outputs $L_1$ and $L_2$ of the two photodetectors, it is probable that the optics 12 of the instrument 10 has been contaminated or that the sensitivity of the detector 14 has lowered. Thus, accurate calibration of the optical instrument 10 can be accomplished with the calibration unit 20A or 20B having the two photodetectors 26 and 28.

The provision of the two identical calibration units 20A and 20B affords redundancy. In case of a failure of one calibration unit the optical instrument 10 can be calibrated by using the other calibration unit. Besides, it is possible to perform two-step calibration by first using either of the two calibration units 20A, 20b and next using the other calibration unit to thereby very accurately and minutely check the status of the whole system inclusive of the optical instrument 10 and the two calibration units. The particulars of the merits of such two-step calibration will be described hereinafter.

Figure 2:
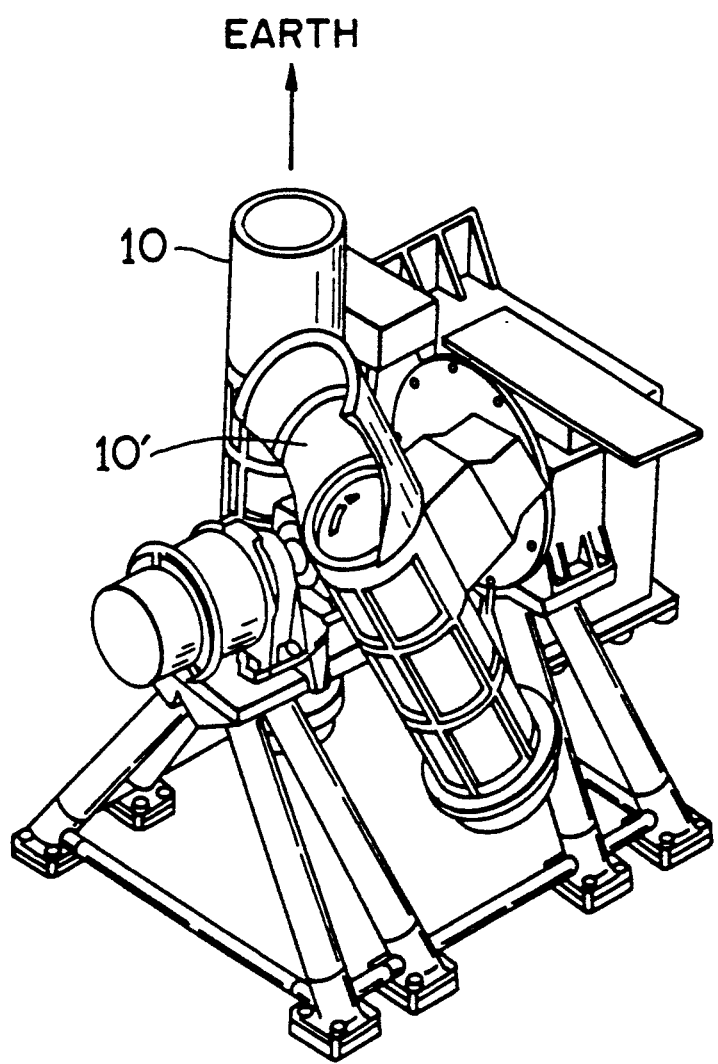
FIG. 2 is a perspective view of a visible and near-infrared radiometer which is to be installed in a resources survey satellite and is provided with a calibration system of the construction shown in FIG. 1.

For example, the above described calibration units 20A, 20B can be used in a visible and near-infrared radiometer which will be installed in a resources survey satellite. FIG. 2 shows the outline of the radiometer. This radiometer has a telescope 10 to measure the intensity of light in the visible and near-infrared region radiated or reflected from the Earth's surface, i.e. radiant intensity of an object of observation. The telescope 10 has optics and CCD detectors to convert light intensity into electrical signals. The telescope 10 is oriented so as to observe an area right below the satellite in orbit. There is another telescope 10' of the same construction for observation of a slightly aft area. The optics of the telescope 10 (or 10') may be gradually contaminated during operation of the satellite, and the sensitivity of the telescope inclusive of the CCD detectors will gradually lower with the lapse of time. Therefore, it is necessary to periodically calibrate the telescope 10 (and 10').

Figure 3:
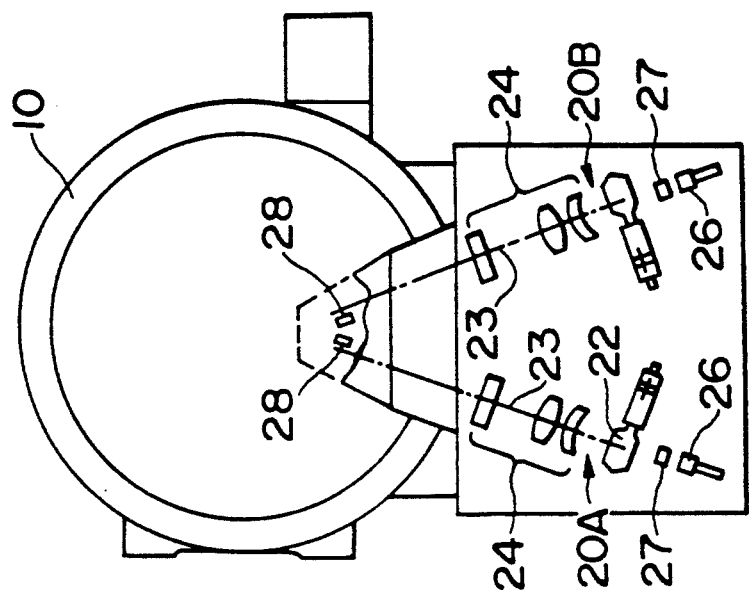
FIG. 3 shows the arrangement of two identical calibration units for calibration of a telescope of the radiometer in FIG. 2.

FIG. 3 shows the arrangement of two identical calibration units 20A and 20B for the telescope 10 of the radiometer. These calibration units 20A, 20B are substantially as described hereinbefore with reference to FIG. 1. Each calibration unit 20A, 20B has a halogen lamp 22, relay optics 24, a first photodetector 26 positioned in the vicinity of the lamp 22, a second photodetector 28 at a short distance from the reference light aperture of the calibration unit and a light intensity monitoring amplifier (not shown in FIG. 3) which is a counterpart of the monitoring amplifier 30 in FIG. 1. A filter 27 is disposed between the halogen lamp 22 and the first photodetector 26 to eliminate thermal noise. As mentioned hereinbefore, the two calibration units 20A and 20B are used individually and independently.

Figure 4:
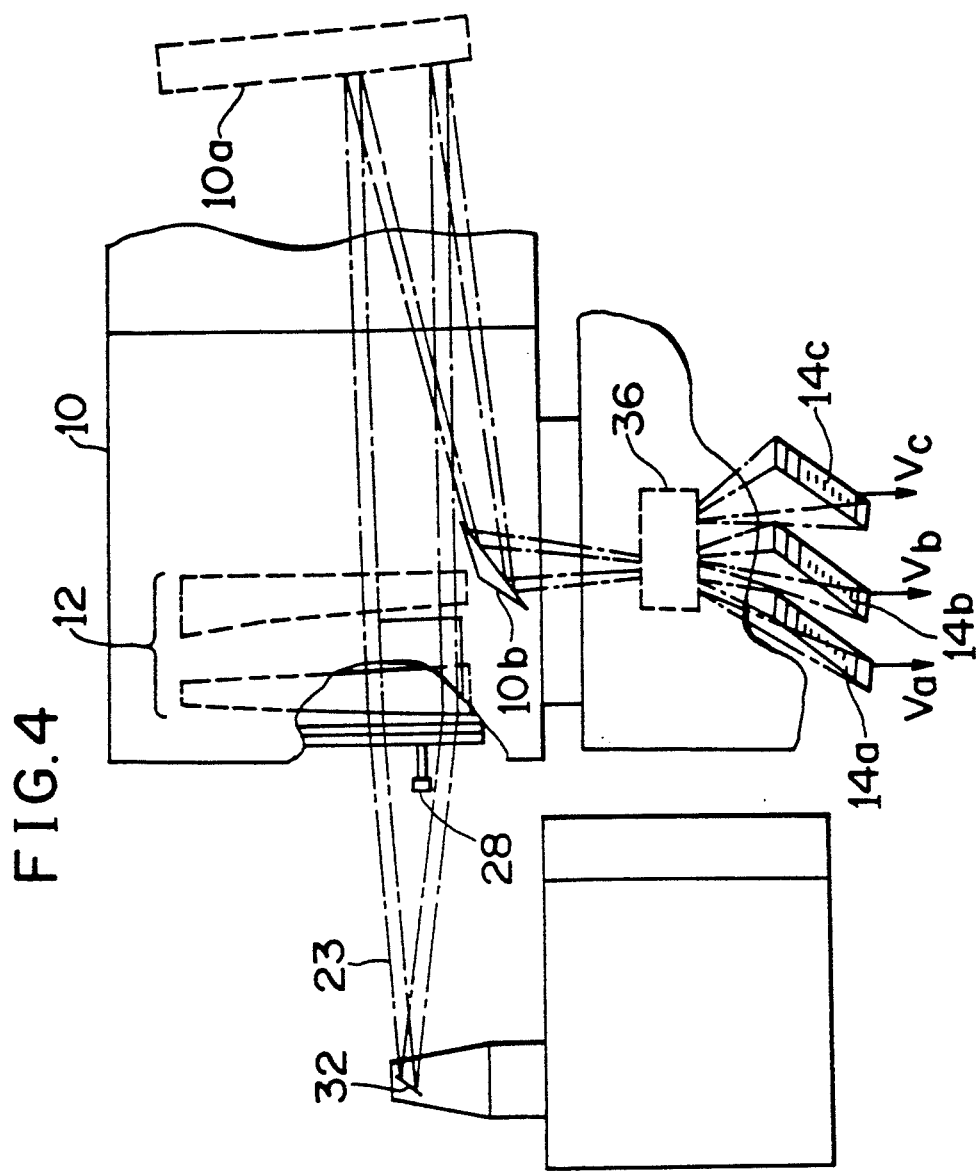
FIG. 4 shows the manner of emergence of the reference light from one of the two calibration units in FIG. 3 into the telescope and the arrangement of a photodetector to monitor the reference light.

The reference light radiated from the halogen lamp 22 passes through the relay optics 24 to provide parallel rays. Referring to FIG. 4, there is a mirror 32 at an end of each calibration unit. The mirror 32 changes the direction of the rays of reference light 23 so as to pass through the optics 12 of the telescope 10. The primary mirror 10a of the telescope 10 reflects the rays of reference light 23 to a secondary mirror 10b, which directs the rays of reference light 23 to a spectral splitting unit 36 comprised of prisms and filters. In the spectral splitting unit 36 the reference light is divided into 3 bands. The telescope 10 has 3 sets of CCD detectors 14a, 14b, 14c which are allotted to the 3 bands, respectively. The whole area of each set of CCD detectors is irradiated with the allotted band of the reference light, whereby every set of CCD detectors 14a, 14b, 14c produces an electrical signal $V_a$, $V_b$, $V_c$.

According to the invention the intensity of the reference light 23 is monitored at two different points by the two photodetectors 26 and 28, respectively. As an important advantage of this calibration method, it is possible to discriminate various types of failures, malfunctions or degradation by checking the calibration outputs $V_a$, $V_b$, $V_c$ of the CCD detectors 14a, 14b, 14c together with the outputs of the respective photodetectors 26, 26. Table 1 illustrates this effect with respect to the case of a single-step calibration using either of the two calibration units 20A, 20B. In Table 1: "PD" stands for photodetector; "O" means a normal output; and "X" means an abnormal output.

TABLE 1

| Case No. | Outputs CCD | 1st PD (26) | 2nd PD (28) | Probable Event |
|---|---|---|---|---|
| 1 | O | O | O | normal |
| 2 | O | O | X | monitoring amp. abnormal |
| 3 | O | X | O | monitoring amp. abnormal |
| 4 | O | X | X | monitoring amp. abnormal |
| 5 | X | O | O | telescope optics abnormal |
| 6 | X | O | X | calibration unit optics abnormal |
| 7 | X | X | O | double failure |
| 8 | X | X | X | lamp abnormal |

By performing two-step calibration using the two calibration units 20A and 20B alternately, it is possible to further minutely discriminate various types of failures, malfunctions or degradation. Table 2 illustrates this effect. For the sake of simplicity, it is assumed that each calibration unit has only one photodetector 26 positioned near the halogen lamp 22. In Table 2, "PD", "O" and "X" have the same meanings as in Table 1.

TABLE 2

| Case No. | Calibration Unit A(20A) CCD | Calibration Unit A(20A) 1st PD (26) | Calibration Unit B(20B) CCD | Calibration Unit B(20B) 1st PD (26) | Probable Event |
|---|---|---|---|---|---|
| 1 | O | O | O | O | normal |
| 2 | O | O | O | X | amp. of unit B abnormal |
| 3 | O | O | X | O | optics of unit B abnormal |
| 4 | O | O | X | X | lamp of unit B abnormal |
| 5 | O | X | O | O | amp. of unit A abnormal |
| 6 | O | X | O | X | amp. of both units A & B abnormal |
| 7 | O | X | X | O | double failure |
| 8 | O | X | X | X | double failure |
| 9 | X | O | O | O | optics of unit A abnormal |
| 10 | X | O | O | X | double failure |
| 11 | X | O | X | O | CCD abnormal |

TABLE 2-continued

| | Outputs | | | | |
|---|---|---|---|---|---|
| | Calibration Unit A(20A) | | Calibration Unit B(20B) | | |
| Case No. | CCD | 1st PD (26) | CCD | 1st PD (26) | Probable Event |
| 12 | X | O | X | X | double failure |
| 13 | X | X | O | O | lamp of unit A abnormal |
| 14 | X | X | O | X | double failure |
| 15 | X | X | X | O | double failufe |
| 16 | X | X | X | X | lamps of both units A & B abnormal, or different multiple failures |

In the case of No. 2, 3 or 4, it suffices to stop using he calibration unit 20B. In the case of No. 5, 9 or 13 it suffices to stop using the calibration unit 20A. Table 2 contains several cases of double failures or multiple failures, but actually the probabilities of such double or multiple failures are very low.

Figure 5:
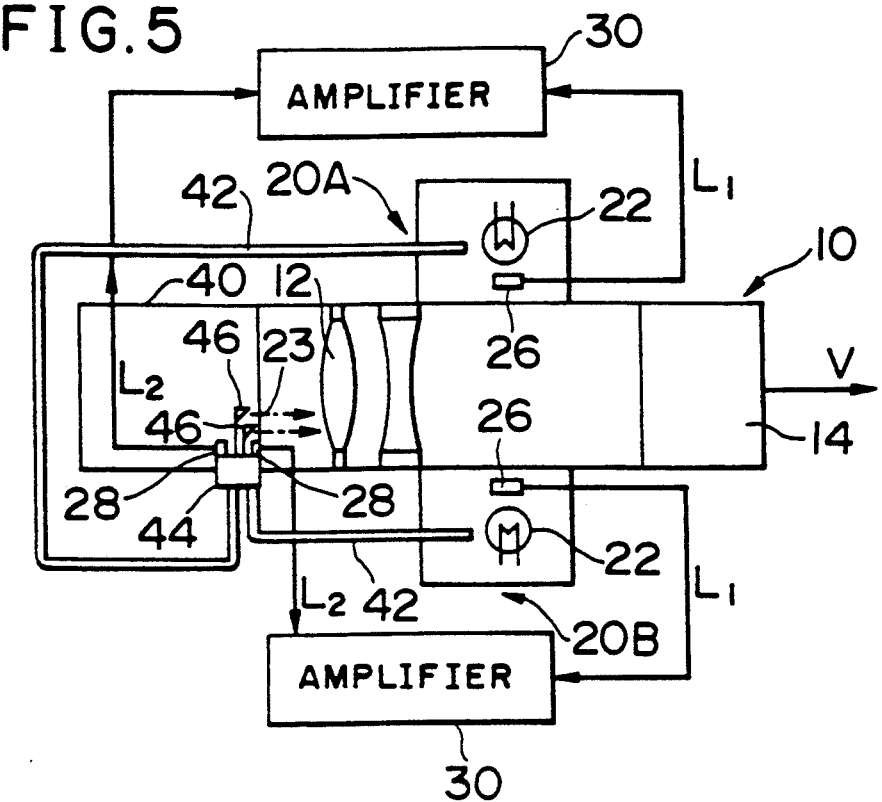
FIG. 5 is a block diagram of a calibration system as another embodiment of the invention.
Figure 6:
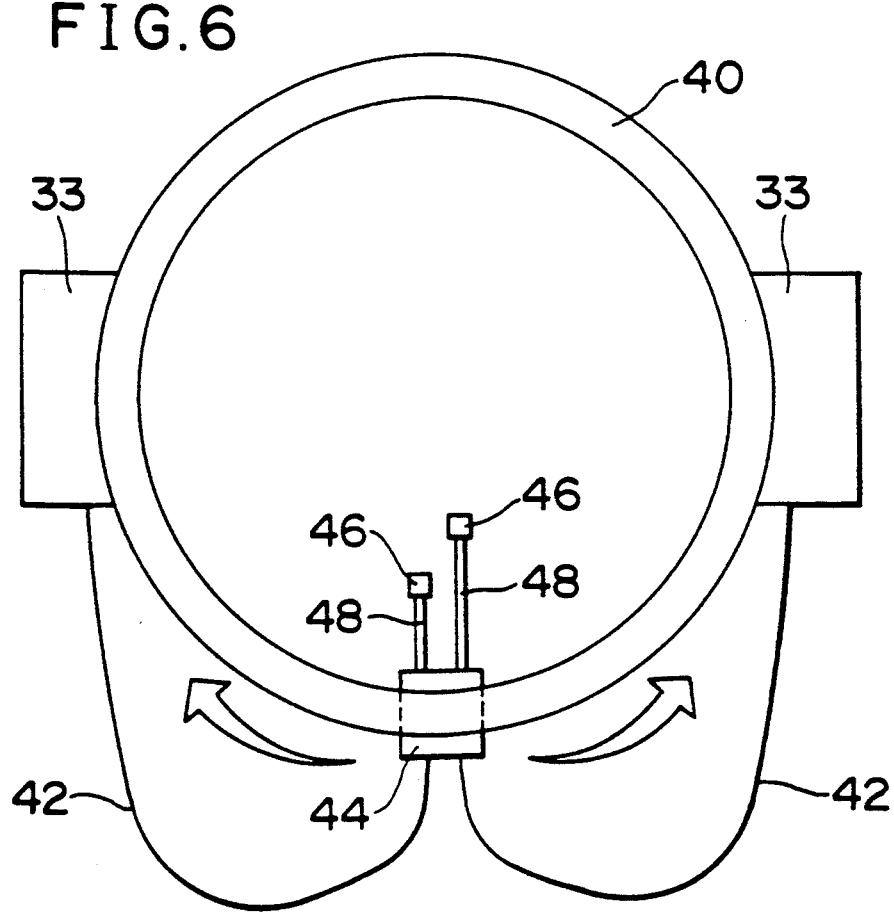
FIG. 6 is an elevational view of a reference light emergence part of the calibration system of FIG. 5.
Figure 7:
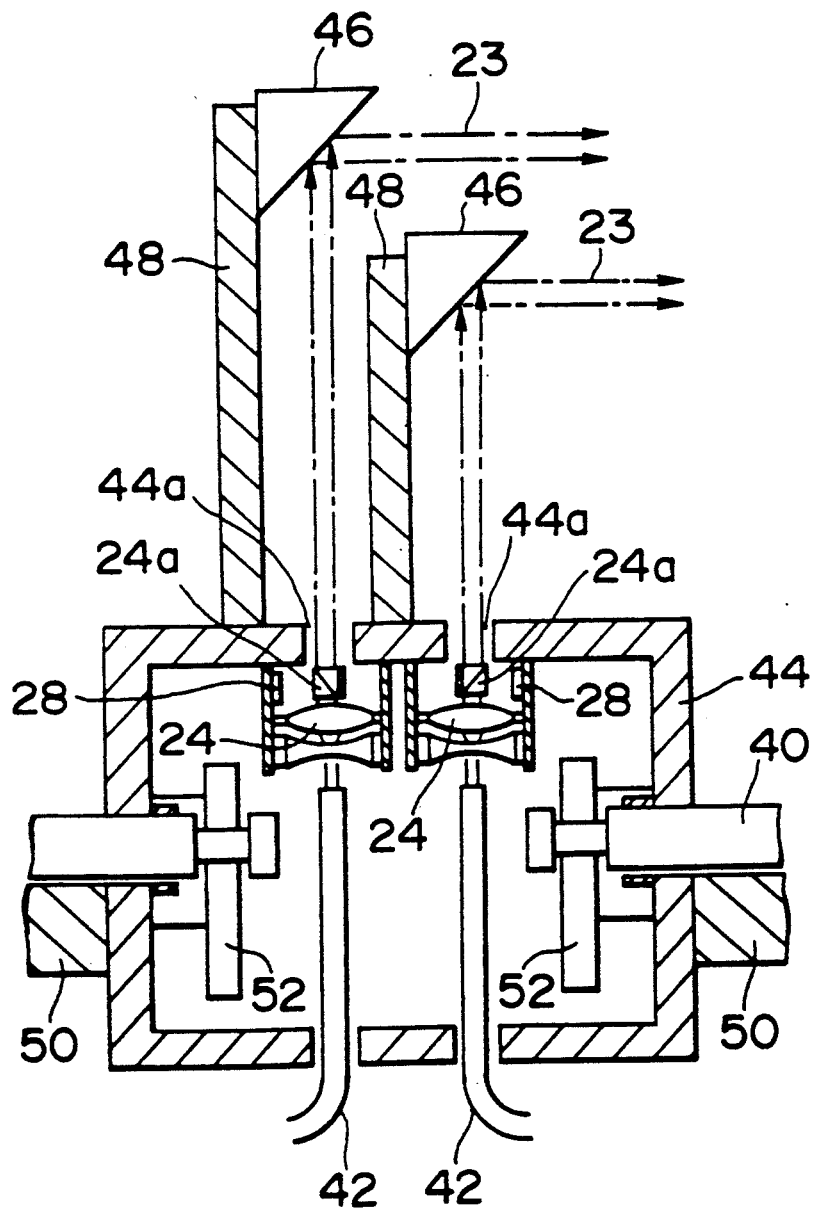
FIG. 7 is an enlarged sectional view of the reference light emergence part.

FIGS. 5-7 show another embodiment of the invention. The subject of calibration is an optical instrument 10 having optics 12 and a detector 14 for photo-electric conversion. The instrument 10 has a cylindrical hood 40 at the light inlet end. This embodiment employs two identical calibration units 20A and 20B, which are fundamentally similar to the calibration units 20A, 20B in FIG. 1. However, each calibration units 20A, 20B is modified in the following points.

An optical fiber 42 is used to transmit the reference light radiated from the halogen lamp 22 to the relay optics 24 shown in FIG. 7) of the calibration unit. The relay optics 24 is held in a box-like cover member 44 which is coupled with the hood 40 of the optical instrument 10. The cover member 44 can be moved circumferentially of the cylindrical hood 40, both clockwise and anticlockwise, by operating a driving unit 50 to rotate wheels 52. The cover member 44 has an aperture 44a for emergence of the reference light 23. Thus, the cover member 44 and the relay optics 24 constitute a movable emergence part of the calibration unit. In this embodiment the cover member 44 is common to the two calibration units 20A and 20B. The relay optics 24 has a half-mirror 24a which is positioned close to the aperture 44a so as to direct a portion of the reference light toward the second photodetector 28 of the calibration unit. In the hood 40 there is a mirror 46 to change the direction of the rays of reference light 23 emerged from the aperture 44a toward the optics 12 of the instrument 10. The mirror 46 is attached to a support pillar 48 which is fixed to the cover member 44, so that the mirror 48 is movable together with the relay optics 24 in the cover member 44. The pillar 48 for the calibration unit 20A and the pillar 48 for the calibration unit 20B have different heights so that the two calibration units 20A, 20B can be operated independently.

In FIG. 6, numeral 33 indicates a monitoring unit inclusive of the halogen lamp 22, first photodetector 26 and the light intensity monitoring amplifier 30 shown in FIG. 5.

In this embodiment the point of emergence of the reference light 23 from each calibration unit 20A, 20B can be changed by moving the cover member 44, whereby the point of incidence of the reference light on the optics 12 of the instrument 10 can be changed about the optical axis of the instrument 10. Therefore, it is possible to check contamination of the optics 12 of the instrument 10 at a plurality of points of the cross-sectional area of the optics 12 to thereby detect an average degree of contamination of the optics 12. Furthermore, according to the need, it is possible to check a fairly large portion of the cross-sectional area of the optics 12 by providing each calibration unit 20A, 20B with a plurality of optical fibers (42) together with correspondingly increased relay optics (24) and mirrors (46) such that each calibration unit has a plurality of paths of reference light and enlarging the aperture (44a) of each calibration unit.

The merits of alternately using the two calibration units 20A and 20B are as described hereinbefore with respect to the first embodiment.

What is claimed is:

1. A calibration system for calibrating an optical instrument installed in a satellite, the system comprising a calibration unit which comprises:
   a light source which radiates reference light;
   a first photodetector positioned in the vicinity of said light source so as to detect the intensity of reference light radiated form said light source;
   a light path which extends form said light source to an aperture from which said reference light emerges to pass through optics of the optical instrument, said light path comprising a combination of means for refracting said reference light and means for reflecting said reference light;
   a second photodetector positioned in the vicinity of said aperture so as to detect the intensity of said reference light emerging form said aperture; and
   means for comparing the intensity of said reference light detected by said second photodetector with the intensity of said reference light detected by said first photodetector.

2. A calibration system according to claim 1, further comprising another calibration unit which is essentially identical with said calibration unit and independent of said calibration unit.

3. A calibration system according to claim 1, wherein said aperture is movable about an optical axis of the optics of the optical instrument, said light path comprising an optical fiber arranged so as to direct said reference light to said aperture irrespective of the position of said aperture.

4. A calibration system according to claim 3, further comprising another calibration unit which is essentially identical with said calibration unit and independent of said calibration unit.

5. A calibration system according to claim 3, wherein in said light path said combination of means for refracting said reference light and means for reflecting said reference light is movable together with said emergence aperture, said optical fiber extending from said light source to said combination.

6. A calibration system according to claim 3, wherein said calibration unit further comprises another light path which is essentially identical with said light path and independent of said light path.

* * * * *